(12) United States Patent
Shah et al.

(10) Patent No.: US 9,160,974 B2
(45) Date of Patent: Oct. 13, 2015

(54) SYSTEMS AND METHODS FOR TRANSCODING AND PLACE SHIFTING MEDIA CONTENT

(75) Inventors: Bhupendra Natwerlan Shah, Bonney Lake, WA (US); Padmanabha R. Rao, Palo Alto, CA (US); Ilya Asnis, San Jose, CA (US)

(73) Assignee: Sling Media, Inc., Foster City, CA (US)

( * ) Notice: Subject to any disclaimer, the term of this patent is extended or adjusted under 35 U.S.C. 154(b) by 159 days.

(21) Appl. No.: 12/548,130

(22) Filed: Aug. 26, 2009

(65) Prior Publication Data

US 2011/0055864 A1    Mar. 3, 2011

(51) Int. Cl.
| | |
|---|---|
| H04N 7/16 | (2011.01) |
| H04N 7/167 | (2011.01) |
| H04N 7/173 | (2011.01) |
| G06F 13/00 | (2006.01) |
| H04N 21/41 | (2011.01) |
| H04N 21/4227 | (2011.01) |
| H04N 21/4402 | (2011.01) |
| H04N 21/4405 | (2011.01) |
| H04N 21/4408 | (2011.01) |
| H04N 21/4627 | (2011.01) |
| H04L 9/06 | (2006.01) |

(52) U.S. Cl.
CPC .............. *H04N 7/1675* (2013.01); *H04L 9/065* (2013.01); *H04N 21/4126* (2013.01); *H04N 21/4227* (2013.01); *H04N 21/4405* (2013.01); *H04N 21/4408* (2013.01); *H04N 21/440218* (2013.01); *H04N 21/4627* (2013.01); *H04L 2209/30* (2013.01); *H04L 2209/34* (2013.01)

(58) Field of Classification Search
None
See application file for complete search history.

(56) References Cited

U.S. PATENT DOCUMENTS

| | | | |
|---|---|---|---|
| 3,416,043 A | 12/1968 | Jorgensen | |
| 4,254,303 A | 3/1981 | Takizawa | |

(Continued)

FOREIGN PATENT DOCUMENTS

| | | |
|---|---|---|
| CN | 1464685 | 12/2003 |
| DE | 4407319 A1 | 9/1994 |

(Continued)

OTHER PUBLICATIONS

International Search Report and Written Opinion for International Application No. PCT/US2006/025911, mailed Jan. 3, 2007.

(Continued)

*Primary Examiner* — Brian T Pendleton
*Assistant Examiner* — Jean D Saint Cyr
(74) *Attorney, Agent, or Firm* — Ingrassia Fisher & Lorenz, P.C.

(57) ABSTRACT

A set-top box (STB), digital video recorder (DVR), video player or other host device receives and interacts with a transcode module to provide enhanced transcoding capabilities that may be useful in placeshifting or other applications. The transcode module includes a host interface that couples to and communicates with the host device. The transcode module also includes a processor that receives an encrypted media stream from the host device via the bus interface, decrypts the encrypted media stream, transcodes the encrypted media stream to a different format, re-encrypts the transcoded stream, and provides the re-encrypted media stream to the host device via the host interface. The transcoded media content may be placeshifted to a remote player, stored at the host, or used for any other purpose.

16 Claims, 3 Drawing Sheets

(56) References Cited

U.S. PATENT DOCUMENTS

Figure 1:
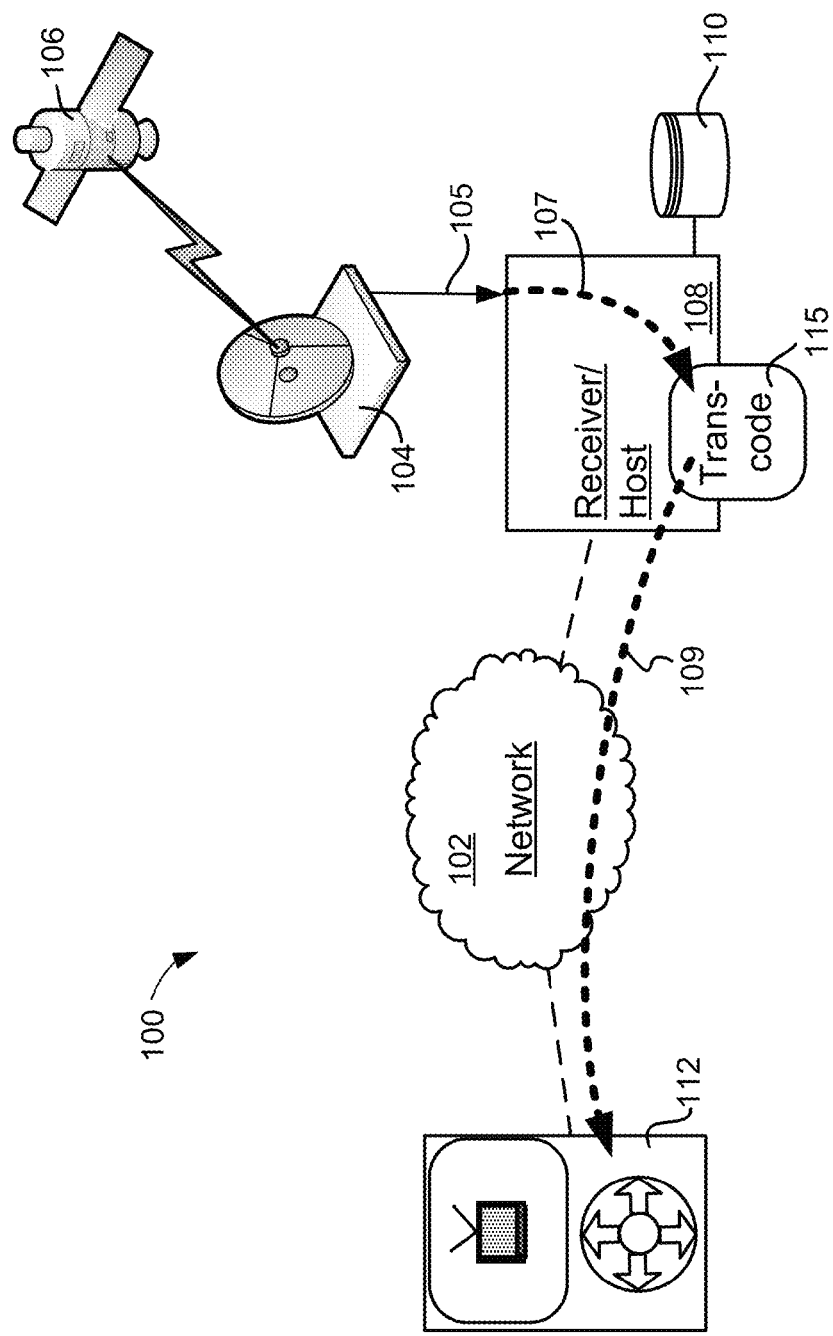

| | | |
|---|---|---|
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,609 B2 | 12/2006 | Chan et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,424,747 B2 | 9/2008 | DeTreville |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |

(56) References Cited

U.S. PATENT DOCUMENTS

| | | |
|---|---|---|
| 7,506,377 B2 | 3/2009 | Hanks |
| 7,565,681 B2 | 7/2009 | Ngo et al. |
| 7,874,003 B2 | 1/2011 | Takashima |
| 7,912,952 B2 | 3/2011 | Mizutani et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0064096 A1* | 5/2002 | Ukita et al. ............ 368/66 |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2002/0196939 A1 | 12/2002 | Unger et al. |
| 2003/0001880 A1 | 1/2003 | Holtz et al. |
| 2003/0009668 A1 | 1/2003 | Chan et al. |
| 2003/0028873 A1 | 2/2003 | Lemmons |
| 2003/0065915 A1 | 4/2003 | Yu et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0091109 A1* | 5/2004 | Son et al. ............ 380/200 |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0205830 A1 | 10/2004 | Kaneko |
| 2004/0212640 A1 | 10/2004 | Mann et al. |
| 2004/0213273 A1 | 10/2004 | Ma |
| 2004/0216173 A1 | 10/2004 | Horoszowski et al. |
| 2004/0230806 A1 | 11/2004 | Lisanke |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0063541 A1* | 3/2005 | Candelore ............ 380/239 |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0198584 A1 | 9/2005 | Matthews et al. |
| 2005/0198686 A1* | 9/2005 | Krause et al. ............ 725/118 |
| 2005/0201726 A1 | 9/2005 | Malcolm et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0262496 A1 | 11/2005 | Seki et al. |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0021057 A1 | 1/2006 | Risan et al. |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0161635 A1 | 7/2006 | Lamkin et al. |
| 2006/0280157 A1 | 12/2006 | Karaoguz et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0286596 A1 | 12/2007 | Lonn |
| 2008/0005676 A1 | 1/2008 | Evans et al. |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0066185 A1 | 3/2008 | Lester et al. |
| 2008/0083035 A1 | 4/2008 | Dong et al. |
| 2008/0134267 A1 | 6/2008 | Moghe et al. |
| 2008/0155702 A1 | 6/2008 | Bala et al. |
| 2008/0195744 A1 | 8/2008 | Bowra et al. |
| 2008/0199150 A1 | 8/2008 | Candelore |
| 2008/0240444 A1 | 10/2008 | Shuster |
| 2008/0263623 A1* | 10/2008 | Hildebrand et al. .......... 725/152 |
| 2008/0267398 A1 | 10/2008 | Peterka et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0070884 A1 | 3/2009 | Wu et al. |
| 2009/0074380 A1 | 3/2009 | Boston et al. |
| 2009/0199248 A1 | 8/2009 | Ngo et al. |
| 2009/0201988 A1* | 8/2009 | Gazier et al. ............ 375/240.06 |
| 2010/0005483 A1 | 1/2010 | Rao |
| 2010/0064076 A1 | 3/2010 | Krikorian et al. |
| 2010/0064332 A1* | 3/2010 | Krikorian et al. ............ 725/110 |
| 2010/0100915 A1 | 4/2010 | Krikorian et al. |
| 2010/0129057 A1 | 5/2010 | Kulkarni |
| 2010/0146527 A1* | 6/2010 | Craib et al. ............ 725/5 |

FOREIGN PATENT DOCUMENTS

| | | |
|---|---|---|
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 2006074110 A | 7/2006 |
| WO | 2007027891 A2 | 3/2007 |

(56) References Cited

FOREIGN PATENT DOCUMENTS

| WO | 2007051156 A2 | 5/2007 |
|---|---|---|
| WO | 2007141555 A2 | 12/2007 |
| WO | 2007149466 A2 | 12/2007 |
| WO | 2008024723 A | 2/2008 |

OTHER PUBLICATIONS

International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
China State Intellectual Property Office "Office Action" issued Mar. 18, 2010 for Application No. 200680022520.6.
China State Intellectual Property Office "Office Action" issued Apr. 13, 2010 for Application No. 200580026825.X.
Canadian Intellectual Property Office "Office Action" mailed Feb. 18, 2010 for Application No. 2569610.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
China State Intellectual Property Office "First Office Action," issued Jan. 8, 2010, for Application No. 200810126554.0.
USPTO Final Office action mailed Jan. 25, 2010; U.S. Appl. No. 11/734,277, filed Apr. 12, 2007.
Australian Government "Office Action," Australian Patent Application No. 2006240518, mailed Nov. 12, 2009.
Jain, Vikal Kumar "Systems and Methods for Coordinating Data Communication Between Two Device," U.S. Appl. No. 12/699,280, filed Feb. 3, 2010.
Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
Newton's Telcom Dictionary, 20th ed., Mar. 2004.
"The Authoritative Dictionary of IEEE Standard Terms," 7th ed. 2000.
Gurzhi, Alexander et al. "Systems and Methods for Emulation Network-Enabled Media Components," U.S. Appl. No. 12/711,830, filed Feb. 24, 2010.
USPTO Final Office Action mailed Mar. 3, 2010; U.S. Appl. No. 11/111,265, filed Apr. 21, 2005.
USPTO, Final Office Action mailed Mar. 12, 2010; U.S. Appl. No. 11/620,711, filed Jan. 7, 2007.
Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms,"Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed Via a Personal Media Broadcaster," U.S. Appl. No. 12/334,959, filed Dec. 15, 2008.
Kulkarni, Anant Madhava "Systems and Methods for Creating Logical Media Streams for Media Storage and Playback," U.S. Appl. No. 12/323,907, filed Nov. 26, 2008.
Rao, Padmanabha R. "Systems and Methods for Linking Media Content," U.S. Appl. No. 12/359,784, filed Jan. 26, 2009.

(56) References Cited

OTHER PUBLICATIONS

Krikorian, Blake Gary et al. "Systems and Methods for Presenting Media Content Obtained From Multiple Sources," U.S. Appl. No. 12/408,456, filed Mar. 20, 2009.
Krikorian, Blake Gary et al. "Systems and Methods for Projecting Images From a Computer System," U.S. Appl. No. 12/408,460, filed Mar. 20, 2009.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1, Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
Canadian Patent Office, Canadian Office Action for Canadian Patent Application No. 2,728,404, dated Aug. 17, 2011.
Unites States Patent Office, Office Action for U.S. Appl. No. 12/166,039, dated Sep. 8, 2011.
Arun L. Gangotri, Office Action for U.S. Appl. No. 12/623,955, dated Jul. 28, 2011.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Lucas, Brian et al. "Systems and Methods for Establishing Connections Between Devices Communicating Over a Network," U.S. Appl. No. 12/426,103, filed Apr. 17, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Conway, Frank et al. "Systems and Methods for Creating Variable Length Clips from a Media Stream," U.S. Appl. No. 12/347,465, filed Dec. 31, 2008.
European Patent Office, International Searching Authority, "International Search Report," mailed Mar. 30, 2010; International Application PCT/US2009/068468 filed Dec. 27, 2009.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
USPTO, Final Office Action, mailed Nov. 6, 2009; U.S. Appl. No. 09/809,868, filed Mar. 15, 2001.
USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
USPTO, Non-Final Office Action mailed Oct. 1, 2009; U.S. Appl. No. 11/778,287, filed Jul. 16, 2007.
USPTO Final Office Action mailed Dec. 30, 2009; U.S. Appl. No. 11/147,664, filed Jun. 7, 2005.
European Patent Office, European Search Report, mailed Sep. 28, 2009 for European Application No. EP 06 78 6175.
International Search Report for PCT/US2008/069914 mailed Dec. 19, 2008.
PCT Partial International Search, PCT/US2009/054893, mailed Dec. 23, 2009.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
Srisuresh, P. et al. "Traditional IP Network Address Translator (Traditional NAT)," Network Working Group, The Internet Society, Jan. 2001.
Asnis, Ilya et al. "Mediated Network address Translation Traversal" U.S. Appl. No. 12/405,039, filed Mar. 16, 2009.
Thiyagarajan, Venkatesan et al. "Always-On-Top Media Player Launched From a Web Browser," U.S. Appl. No. 12/617,271, filed Nov. 12, 2009.
Paul, John Michael et al. "Systems and Methods for Delivering Messages Over a Network," U.S. Appl. No. 12/619,192, filed Nov. 16, 2009.

(56) References Cited

OTHER PUBLICATIONS

Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
European Patent Office, European Search Report for European Application No. EP 08 16 7880, mailed Mar. 4, 2009.
MythTV Wiki, "MythTV User Manual" [Online], Aug. 27, 2007, XP002515046; retrieved from the Internet: <URL:http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [052], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast : Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
USPTO "Non-Final Office Action" mailed Apr. 7, 2011; U.S. Appl. No. 12/166,039, filed Jul. 1, 2008.
USPTO "Final Office Action" mailed Feb. 10, 2012; U.S. Appl. No. 12/623,955, filed Nov. 23, 2009.
CIPO, "Office Action" mailed Jan. 9, 2012; Canadian Appln. No. 2,728,404.

\* cited by examiner

SYSTEMS AND METHODS FOR TRANSCODING AND PLACE SHIFTING MEDIA CONTENT

TECHNICAL FIELD

This document generally relates to transcoding and/or place shifting of media content, and more particularly relates to systems and methods for enhancing the ability of a set-top box (STB), digital video recorder (DVR), media player and/or other host device to transcode and/or place shift media content.

BACKGROUND

Most television viewers now receive their television signals through a content aggregator such as a cable or satellite television provider. For subscribers to a direct broadcast satellite (DBS) service, for example, television programming is received via a broadcast that is sent via a satellite to an antenna that is generally located on the exterior of a home or other structure. Other customers receive television programming through a cable, wireless or other medium. Programming is typically received at a receiver such as a "set top box" (STB) that demodulates the received signals and that converts the demodulated content into a format that can be presented to the viewer on a television or other display. In addition to traditionally-received television content, viewers also commonly enjoy media content that is provided from a digital video recorder (DVR), a DVD/Blu-Ray or other removable media player, a network source of streaming media, and/or any number of other sources. The capability to render such media content may be incorporated within a STB or other receiver device, and/or may be provided by any number of other standalone-type devices.

More recently, consumers have expressed significant interest in "place shifting" devices that allow viewing of television or other media content at locations other than their primary television set. Place shifting devices typically packetize media content that can be transmitted over a local or wide area network to a portable computer, mobile phone, personal digital assistant or other remote device capable of playing back the packetized media stream for the viewer. Placeshifting therefore allows consumers to view their media content from remote locations such as hotel rooms, offices, or any other locations where media player devices can gain access to a wireless or other communications network.

Although many different types of STBs, DVRs, disk players and other media host devices are widely deployed around the world, the vast majority of these devices do not presently support placeshifting functionality. Moreover, many host devices lack the desired processing capability to effectively transcode media streams into formats suitable for placeshifting and other purposes. Still further, the inherently insecure nature of digital communications (particularly over public networks such as the Internet) can create challenges in ensuring that only authorized users and players are allowed access to valuable media content that may be transmitted during a placeshifting session.

It is therefore desirable to create systems, devices and methods for allowing STBs, DVRs and/or other media host devices to effectively transcode media data and/or to securely placeshift media content from the host device to a remote media player. These and other desirable features and characteristics will become apparent from the subsequent detailed description and the appended claims, taken in conjunction with the accompanying drawings and this background section.

BRIEF SUMMARY

According to various exemplary embodiments, a set-top box (STB), digital video recorder (DVR), video player or other host device is able to receive and interact with a transcode module to provide enhanced transcoding capabilities. Such transcoding may be used to support placeshifting of media content processed by the host device, and/or any other purpose.

In various embodiments, a transcoded module includes a host interface, such as a universal serial bus (USB) or similar interface, that couples to and communicates with the host device. The transcode module also includes a processor that is configured to receive a first encrypted stream from the host device via the host interface, wherein the first encrypted stream comprises a media stream in a first format, and wherein the processor is further configured to decrypt the encrypted stream, to transcode the media stream from the first format to a second format different from the first format, to encrypt the transcoded media stream in the second format to generate a second encrypted stream, and to provide the second encrypted stream to the host device via the host interface. In some embodiments, the second encrypted stream may be provided over a network to a remote player device. In other embodiments, the transcoded media stream may be stored at the host device or used for any other purpose.

Other embodiments provide a method executable by a digital processor in a transcode module that interfaces with a host device via a host interface. The method suitably comprises receiving a first encrypted media stream from the host device via the host interface, wherein the first encrypted media stream comprises a media stream in a first format, decrypting the first encrypted media stream to extract the media stream in the first format, transcoding the extracted media stream from the first format to a second format different from the first format, encrypting the transcoded media stream in the second format to generate a second encrypted media stream, and providing the second encrypted media stream to the host device via the host interface.

Other embodiments provide a method executable by a host device for placeshifting a media stream in a first format to a remote player via a communication network. The method suitably comprises encrypting a media stream in a first format to create an encrypted media stream, providing the encrypted media stream to a transcode module that is physically coupled to the host device, receiving a transcoded media stream from the transcode module at the host device, wherein the transcoded media stream comprises the media stream in a second format different from the first format, and directing the transmission of the transcoded media stream from the host device to a remote player via a communication network.

Still other embodiments provide a set top box configured to receive a television programming stream for presentation on a display, the set top box comprising a receiver interface configured to receive the television programming stream, a display interface configured to provide television programming signals to the display, a network interface configured to be coupled to a digital communications network, a bus interface configured to couple with a transcode module, and a controller. The controller is configured to direct the reception of the television programming stream via the receiver interface, to receive a request for a placeshifting session from a remote player via the network interface, to establish an encryption key with the transcode module, to encrypt the received television programming stream using the session key, to provide the encrypted television programming stream to the transcode module, to receive a transcoded media stream from the transcode module via the bus interface, and to transmit the transcoded media stream to the remote player via the network interface.

Various other embodiments, aspects and other features are described in more detail below.

BRIEF DESCRIPTION OF THE DRAWING FIGURES

Figure 2:
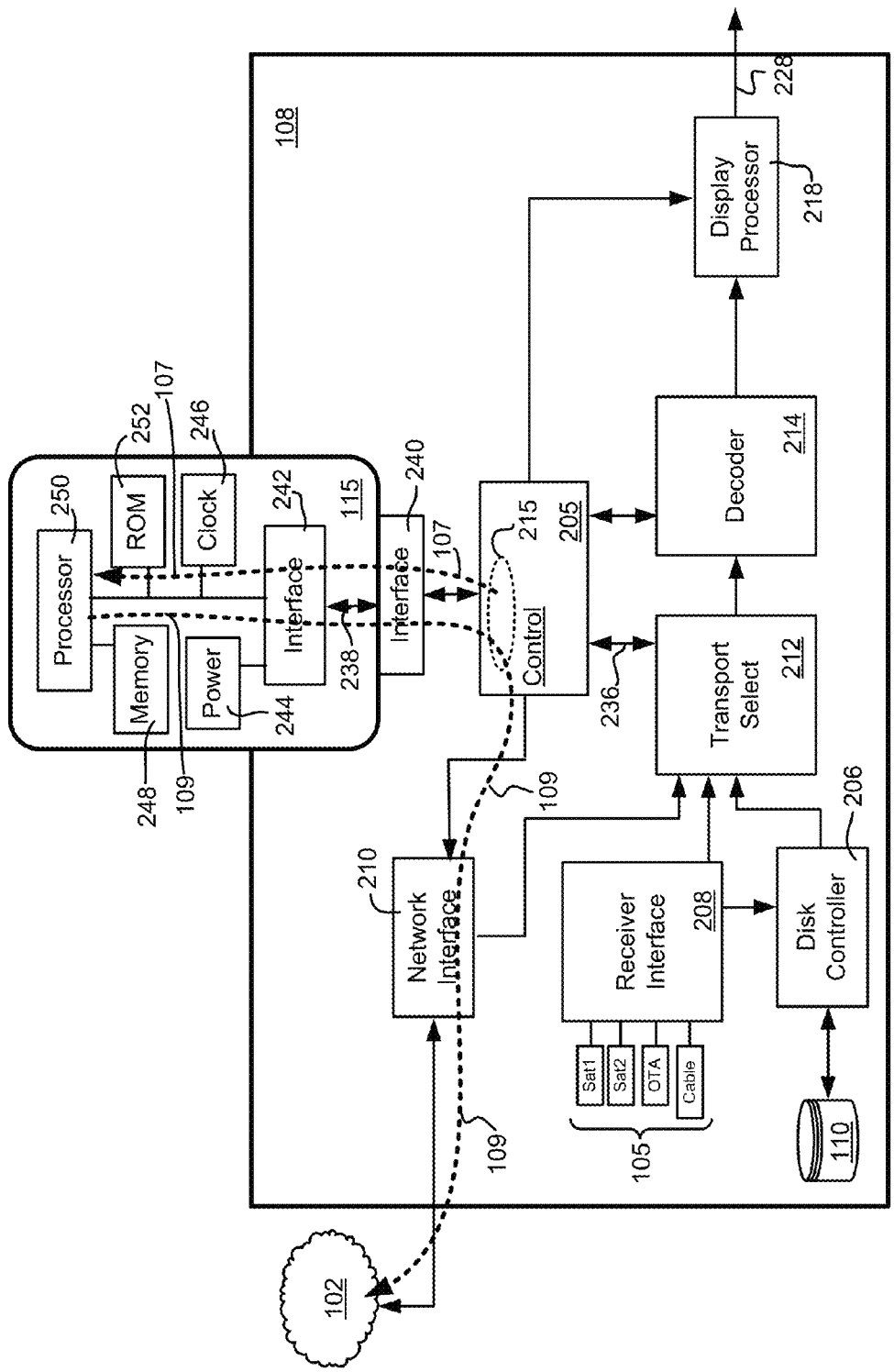
Figure 3:
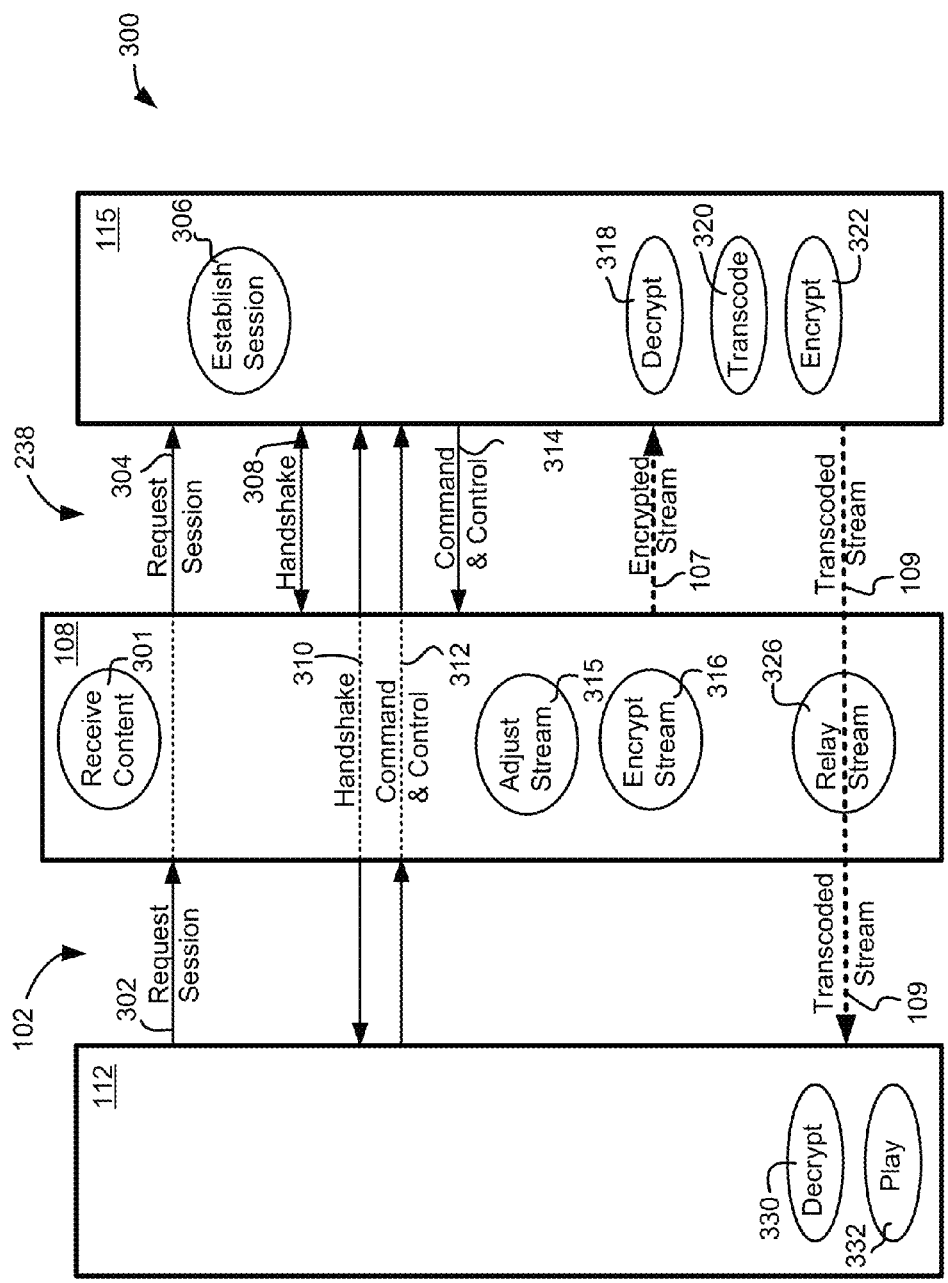

Exemplary embodiments will hereinafter be described in conjunction with the following drawing figures, wherein like numerals denote like elements, and FIG. 1 is a block diagram of an exemplary system for placeshifting a media stream over a network to a remote player using host device a transcode module;

FIG. 2 is a block diagram of an exemplary host device that is interfaced with an exemplary transcode module; and FIG. 3 is a data flow diagram showing exemplary processes for establishing secure placeshifting between a host device, a transcode module and a remote device.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In various embodiments, host devices that may not have previously been capable of advanced media processing functions are enhanced through the addition of a transcode module that can be physically connected to the host device to allow transcoding, placeshifting and/or other capabilities. The transcode module is a separate hardware module that can be plugged in or otherwise directly coupled to the host device to provide enhanced functionality (e.g., using a universal serial bus (USB) or similar interface). Any number of different host devices such as set top boxes (STBs), television receivers, digital video recorders (DVRs), DVD/Blu-Ray or other removable media players and/or the like can therefore accept the transcoded module at a convenient interface, and can thereafter use the transcoded module to provide capabilities that were not previously available using the device itself. To that end, the transcode module appropriately provides the physical, logical and other capabilities that may not otherwise be present in the host device to support placeshifting, transcoding and/or other desired additional features. Various embodiments further maintain the security of media place shifting and other features through the use of authentication, cryptography and/or other features, as described more fully below.

Certain systems and techniques described herein may find particular benefit when host devices capable of receiving television signals (e.g., signal feeds from a satellite, cable, wireless or other source) are enhanced to provide place shifting features. As an example, a network-enabled set top box (STB) that did not previously support placeshifting features could accept an external transcode module via a universal serial bus (USB) or similar interface to enhance the capabilities of the STB. The invention is not so limited, however; to the contrary, the features described herein may be used in conjunction with any number of conventional systems and devices, including those that interact with other external devices such as television receivers, removable media players, digital or personal video recorders, and/or other sources of programming content to support transcoding, placeshifting and/or other media processing features.

Turning now to the drawing figures and with initial reference to FIG. 1, an exemplary placeshifting system 100 suitably includes a host device 108 that physically and logically interfaces with a transcode module 115 that provides transcoding or other capabilities to facilitate enhanced functionality of host device 108, as described more fully below. Generally speaking, host device 108 uses transcode module 115 to provide transcoding, placeshifting, and/or other additional features as desired. FIG. 1, for example, shows host device 108 providing a media stream 107 to the transcoded module 115 that can be transcoded into an appropriate placeshifting format and transmitted over network 102 as stream 109 to a remotely-located player device 112. FIG. 1 shows stream 107 as being generated based upon received television programming 105, although equivalent embodiments could provide stream 105 based upon content stored in a DVR or other database 110, content received from a network server on network 102, and/or content obtained from any other source. Streams 107 and 109 are both encrypted as appropriate to prevent unauthorized interception of valuable media content during transfer between host device 108 and transcode module 115, or during transmission over network 102.

FIG. 1 illustrates an exemplary placeshifting system in which remote player 112 receives stream 109 from transcode module 115 using the network interface associated with host device 108. Other embodiments, however, may use transcode module 115 for any additional or alternate purpose. The transcoded stream 109 may be stored at host device 108 (e.g., as a file in database 110), for example, to facilitate later playback using host device 108. Other embodiments may additionally or alternatively transfer the transcoded stream 109 in streaming or file-based format to a media player, mobile phone, portable computer, or other device that is directly connected to host device 108 for later playback. Stream 109 may therefore be used for any other purpose in place of or in addition to placeshifting.

Network 102 is any digital or other communications network capable of transmitting messages between senders and receivers. In various embodiments, network 102 includes any number of public or private data connections, links or networks supporting any number of communications protocols. Network 102 may include the Internet, for example, or any other network based upon TCP/IP or other conventional protocols. In various embodiments, network 102 may also incorporate a wireless and/or wired telephone network, such as a cellular communications network for communicating with mobile phones, personal digital assistants, and/or the like. Network 102 may also incorporate any sort of wireless or wired local area networks, such as one or more IEEE 802.3 and/or IEEE 802.11 networks. Host device 108 is therefore able to communicate using network 102 in any manner. Such communication may take place over a wide area link that includes the Internet and/or a telephone network, for example; in other embodiments, communications on network 102 (e.g., between devices 108 and 112) may take place over a wired or wireless local area link incorporated within network 102. Various types of networks 102 may include any number of wired, wireless and/or other links using any number of conventional networking and communications techniques.

Host device 108 is any component, hardware and/or the like capable of receiving and processing media content. In various embodiments, host device 108 interfaces with an external transcode module 115 to provide placeshifting, transcoding and/or other features. In the embodiment shown in FIG. 1, for example, host device 108 suitably provides a media stream 107 to the transcode module 115 to allow transcoding into an appropriate digital format that can be transmitted over network 102, or used for any other purpose. In such embodiments, transcode module 115 further establishes placeshifting sessions with remote devices 112 using the network communications capabilities of host device 108 for distribution of the transcoded stream 109. Content of media stream 107 may be received at host device 108 in any format, and from any source such as a broadcast, cable or satellite television programming source, a "video-on-demand" or similar source, a digital video disk (DVD) or other removable media, a video camera, and/or the like.

To that end, many implementations of host device 108 include media receivers or players that may not be capable of independently providing placeshifting or transcoding features without transcode module 115, but that nevertheless include some form of content receiving and/or playing capabilities. Host device 108 may be a STB or other receiver that also provides transcoding and/or placeshifting features, for example, as described more fully below. Such a device may receive satellite, cable, broadcast and/or other signals that encode television programming 105 from an antenna 104, modem, server and/or other source. Such a receiver may further demodulate or otherwise decode the received signals 105 to extract programming that can be locally viewed and/or place shifted to a remote viewer 112 as appropriate. In some embodiments, host device 108 decrypts content received from a broadcaster or other content provider using, for example, a cryptographic key or other credential obtained from the content provider or its agent. In other embodiments, host device 108 is any other hardware or other device capable of receiving and processing media content, such as any sort of digital video recorder (DVR), DVD/Blu-Ray or other removable media player, and/or the like. Other types of host devices 108 may receive and process content received from any external receiver, STB, removable media player, streaming source and/or the like. In still other embodiments, host device 108 is any sort of general or special purpose computing system, including any sort of personal computer, workstation, media player, or other device capable of interfacing with network 102.

In the exemplary embodiment illustrated in FIG. 1, host device 108 is shown receiving digital broadcast satellite (DBS) signals 105 from a satellite 106 at an antenna 104. Equivalent embodiments, however, could receive programming 105 from any sort of cable connection, broadcast source, removable media, service provider accessible via network 102, any external device and/or the like. Some embodiments may also include a content database 110 stored on a hard disk drive, memory, or other storage medium to support a personal or digital video recorder (DVR) feature as appropriate. In embodiments that include DVR functionality, programming may be stored in database 110 as desired (e.g., in response to user/viewer programming instructions) for subsequent viewing on a television or other display located in relatively close proximity to the host device 108; programming need not be stored in all instances or embodiments, however, and programming could be alternately provided in real time. As noted above, content that would conventionally be presented on a television or other display associated with device 108 may be instead placeshifted to a remote device 112 over network 102 using the features of transcode module 115, as described more fully below.

Transcode module 115 is any device, component or other hardware capable of physically interfacing with the host device 108 and of logically providing transcoding, placeshifting and/or other media processing capabilities for host device 108. In various embodiments, transcode module 115 includes a digital signal processor, microprocessor, microcontroller or other appropriate processing circuitry that facilitates transcoding of video signals provided by host device 108 into a format that can be more readily transmitted on network 102 or used for other desired purposes. Transcode module 115 may be physically provided on a circuit card or other substrate that physically and logically interfaces with host device 108. Transcode module 115 may interface with host device 108 using, for example, a conventional uniform serial bus (USB), IEEE 1394 ("Firewire") or similar bus-type interface that allows serial or parallel transfer of data between host device 108 and transcode module 115 at an appropriate data rate. In some embodiments, much (if not all) of the electrical power consumed by the transcode module 115 is provided from host device 108 using the direct bus connection between the two components. A conventional USB bus, for example, provides a 2.5 volts source that may be used to power some or all of the various components of transcode module 115.

Remote device 112 is any device, component, module, hardware, software and/or the like capable of receiving and playing a media stream 109 that is place shifted from transcode module 115 via host device 108. In various embodiments, remote device 112 is personal computer (e.g., a "laptop" or similarly portable computer, although desktop-type computers could also be used), a mobile phone, a personal digital assistant, a personal media player (such as the ARCHOS products available from the Archos company of Igny, France or the various iPod products available from Apple Computer Inc. of Cupertino, Calif.), a set top box or other receiver, a television monitor and/or the like. In many embodiments, remote device 112 is a general purpose computing device that includes a media player application in software or firmware that is capable of securely connecting to transcode module 115 via network 102, as described more fully below, and of receiving and presenting media content to the user of the device as appropriate. In other embodiments, remote device 112 is a special-purpose media player that allows for presentation of the received media stream on a remotely-located television or other display. One example of such a device is the SLINGCATCHER product available from Sling Media of Foster City, Calif., although other devices could be equivalently used in other embodiments.

Many different placeshifting scenarios could be formulated based upon available computing and communications resources, as well as consumer demand. In various embodiments, consumers may wish to placeshift content within a home, office or other structure, such as from a host device 108 to a desktop computer, portable computer or television located in another room. In such embodiments, the content stream 109 will typically be provided over a wired or wireless local area network operating within the structure. In other embodiments, consumers may wish to placeshift content over a broadband or similar network connection from a primary location to a computer, television or other remote device 112 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE, CDMA/EVDO or other connection, an IEEE 802.11 "Wi-fi" link, and/or the like). Several examples of placeshifting applications available for various platforms are provided by Sling Media of Foster City, Calif., although the concepts described herein could be used in conjunction with products and services available from any source.

It is generally desirable to maintain security of the placeshifting process to ensure that unauthorized users and unauthorized players do not gain access to programming content. This is particularly true when host device 108 is a television receiver, STB or DVR that also provides placeshifting capabilities, since the amount of valuable content available within the device could be significant. To maintain the security of the connection, then, media content 107 provided from the host device 108 to the transcode module 115 is appropriately encrypted to prevent unauthorized interception of the content. Transcoded content 109 is similarly encrypted prior to transport to the host device 108 or to the remote player over network 102.

Content 105 received at any sort of host device 108 can therefore be converted by transcode module 115 to a packetized media stream 109 that can be transmitted on network 102 or used for any other purpose. To maintain the security of the media streams 107 and 109, transcode module 115 may establish digital credentials (e.g., digital signatures, symmetric or asymmetric keys, and/or the like) with host device 108 and/or remote player 112 that allow for secure access to placeshifting and transcoding features, as explained more fully below. Content 105 can therefore be received, demodulated and or otherwise processed at host device 108, where it is encrypted for transport to transcoded module 115. This encrypted stream 107 is provided over a bus or other direct connection to transcoded module 115, which is then able to decrypt, transcoded and re-encrypt the content to create a transcoded stream 109. The transcoded stream 109 may be transmitted from transcode module 115 to a remote device 112 using the network communications capabilities of host device 108.

Note that various equivalent embodiments may provide transcoding features other than placeshifting using transcode module 115. To that end, transcode module 115 could be used for any transcoding application, such as the conversion of high definition video to standard definition video, or conversion between any number of different media formats. Transcode module 115 may be used, for example, to transcode received data into a streaming or file format that can be readily transferred to a portable media player for subsequent playback. Such conversions could take place in real time (e.g., as a media stream 105 is received at host device 108), or in any other manner. Transcode module 115 could be equivalently used to transcode received video signals 105 from an MPEG or other received format into a different format (e.g., H.264 or the like) for DVR or other storage in a more efficient or more highly compressed format. Other features and uses may be contemplated in any number of equivalent embodiments.

FIG. 2 provides additional detail about an exemplary transcoder module 115 that interfaces with a host device 108, as appropriate. Although FIG. 2 describes a host device 108 that receives and decodes content 105, the concepts set forth herein could be equivalently applied to devices 108 that receive or decode content obtained from any sort of external receiver, DVR, media player, computer system, server and/or the like. Further, other embodiments may incorporate additional or alternate processing modules from those shown in FIG. 2, may omit one or more modules shown in FIG. 2, and/or may differently organize the various modules in any other manner different from the exemplary arrangement shown in FIG. 2.

Host device 108 may be logically and physically implemented in any manner. FIG. 2 shows various logical and functional features that may be present in an exemplary host device 108; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. Any number of the modules shown in FIG. 2, for example, may be implemented as a "system on a chip" (SoC) using any suitable processing circuitry under control of any appropriate control logic 205. In various embodiments, control logic 205 executes within an integrated SoC or other processor that implements receiver 208, transport selector 212, decoder 214, display processor 218 and/or disk controller 206, as appropriate. In such embodiments, the integrated SoC processor may interact with a transcode module 115 as well as any other input or output devices to produce desired outputs based upon inputs received from local or remote users. Broadcom Corporation of Irvine, Calif., for example, produces several models of processors (e.g., the model BCM 7400 processor) that are capable of supporting SoC implementations of satellite and/or cable receiver systems, although products from any number of other suppliers could be equivalently used. In still other embodiments, various distinct chips, circuits or components may be inter-connected and inter-relate with each other to implement the receiving and decoding functions represented in FIG. 2. Host device 108 as shown in FIG. 2 therefore includes any number of appropriate modules for obtaining and processing media content as desired for the particular embodiment. Each of these modules may be implemented in any combination of hardware and/or software using logic executed within any number of semiconductor chips or other processing logic.

Various embodiments of control logic 205 can include any circuitry, components, hardware, software and/or firmware logic capable of controlling the various components device 108. Various routines, methods and processes executed within device 108 are typically carried out under control of control logic 205 in conjunction with transcode module 115, as described more fully below.

In various embodiments, control logic 205 executes a driver program 215 that communicates with transcode module 115 to manage transcoding, placeshifting and/or other features accessing transcoded module 115 as desired. Application 215 suitably executes on host device 108 and communicates with processor 250 or other features of transcode module 115 using any appropriate application programming interface (API) or the like. The control application 215 may also interact with other applications, processes and/or other features of host device 108 using any sort of functional API, as desired. In various embodiments, a driver application 215 executes within control logic 205 of host device 108 to allow software applications executing on host device 108 to use processor 250 as a co-processor or the like that is capable of efficiently and effectively performing real-time (or other) transcoding of media streams from one format to another. Driver program 215 may be any sort of conventional application, applet, driver or other software logic that is capable of facilitating communications between host device 108 and transcode module 115. In various embodiments, a common design for transcode module 115 may be used with multiple types of host devices 108 by generating a driver program 215 for each type of host device 108 that is supported by the transcode module 115.

As noted above, many embodiments of host device 108 include an audio and/or video receiver 208, which is any hardware, software, firmware and/or other logic capable of receiving media content via one or more content sources 105. In various embodiments, content sources 105 may include cable television, DBS, broadcast and/or other programming sources as appropriate. Receiver 208 appropriately selects a desired input source and provides the received content to an appropriate destination for further processing. In various embodiments, received programming may be provided in real-time (or near real-time) to a transport stream select module 212 or other component for presentation to the user as the programming is received. Alternatively, receiver 208 may provide content received from any source to a disk or other storage medium in embodiments that provide DVR functionality. In such embodiments, device 108 may also include a disk controller module 206 that interacts with an internal or external hard disk, memory and/or other device that stores content in a database 110, as described above. Receiver 208 may also provide demodulation, decryption, and/or other processing to extract a compressed transport stream (e.g., an MPEG transport stream) that can be decoded for presentation on a display associated with the host device 108 and/or provided to transcoded module 115, as desired.

In the embodiment shown in FIG. 2, device 108 also includes an appropriate network interface 210, which operates using any implementation of protocols or other features to support communication by device 108 on network 102. In various embodiments, network interface 210 supports conventional LAN, WAN or other protocols (e.g., the TCP/IP or UDP/IP suite of protocols widely used on the Internet) to allow device 108 to communicate on network 102 as desired. Network interface 210 typically interfaces with network 102 using any sort of LAN adapter hardware, such as any conventional network interface card (NIC) or interface to any external wired or wireless network adapter, as appropriate.

Transport stream select module 212 is any hardware and/or software logic capable of selecting a desired media stream from the available sources. In the embodiment shown in FIG. 2, transport select module 212 is able to generate video signals for presentation on one or more output interfaces 228. The stream may be selected from any available source of content, such as network interface 210, receiver interface 208 and/or a DVR or other storage feature associated with database 110. In various embodiments, transport select module 212 is able to provide an encoded video signal 236 to transcode module 115 in response to control logic 105. Transport select module 212 may also respond to viewer inputs (e.g., via control logic 205) to simply switch encoded content received from a live source 105, from network interface 210 or from storage 110 to one or more decoder modules 214.

Device 108 may include any number of decoder modules 214 for decoding, decompressing and/or otherwise processing received/stored content as desired. Generally speaking, decoder module 214 decompresses or otherwise processes received content from stream select module 212 to extract encoded programming. The decoded content can then be processed by one or more display processor modules 218 to create a display for the viewer in any appropriate format.

Display processor module 218 includes any appropriate hardware, software and/or other logic to create desired screen displays at interfaces 242, 244, 246 as desired. In various embodiments, display processing module 218 is also able to produce on screen displays (OSDs) for electronic program guide (EPG), setup and control, input/output facilitation and/or other features that may vary from embodiment to embodiment. Such displays are not typically contained within the received or stored broadcast stream, but are nevertheless useful to users in interacting with device 108 or the like. The generated displays, including received/stored content and any other displays may then be presented to one or more output interfaces 228 in any desired format. In various embodiments, display processor 218 produces an output signal encoded in any standard format (e.g., ITU656 format for standard definition television signals or any format for high definition television signals) that can be readily converted to standard and/or high definition television signals at interface 228 for presentation to the viewer on any sort of television or other conventional display.

In placeshifting embodiments, application 215 or another feature of control logic 205 suitably receives the selected stream, encrypts the selected stream, and provides the encrypted stream 107 to transcode module 115 via interface 240. Transcoding module 115 then partially or fully decodes the video signal 236 before re-encoding and packetizing the decoded content for subsequent transmittal over network 102 as stream 109, as described herein. Stream 107 may be generated at control logic 205 from signal 236 provided by transport select module 212, then, although other embodiments provide the compressed media content from decoder 214 or the like. Decoder 214 may be used in some embodiments to extract, decrypt or otherwise provide a compressed stream from a multiplex or other delivery mechanism, for example, that may be provided to control logic 205 for encryption and delivery to transcode module 115 as stream 107. On screen displays (e.g., EPG information) and/or other features generated by display processor 218 may also be provided to transcode module 115 as part of stream 107 in some embodiments.

Driver application 215 or other logic executing within host device 108, then, allows one or more output channels to be diverted to a transcoding module 115 for placeshifting over network 102. In such embodiments, compressed video is encrypted and directed toward transcode module 115 as desired. Output that would otherwise be sent to channel 228, for example, may be additionally or alternately provided to the transcoding module 115. An output signal encoded as an MPEG transport stream, for example, may be provided as an input to transcoding module 115 to support digital-to-digital conversion to a media format that can be readily transmitted on network 102. In other embodiments, stream 107 may be provided to transcoder 115 in any other format, such as any MPEG-2, MPEG-4 or other format used in transporting signals 105, storing content in DVR 110, and/or the like. In such embodiments, compressed video may be provided to transcode module 115 from transport select module 112 or from any other source as desired.

To that end, transcoding module 115 suitably includes any appropriate hardware, software, firmware and/or combination thereof for producing media streams or files in suitable formats for subsequent use. Transcode module 115 may be implemented using any sort of printed circuit board or other substrate, which may be enclosed in any sort of housing or other packaging to allow for convenient interfacing with host device 108. In the exemplary embodiment shown in FIG. 2, transcode module 115 suitably includes a host interface 242, a processor 250, power management circuitry 244, clock generation circuitry 246, digital memory 248 and a control ROM 252 as appropriate. Other embodiments may include additional or alternate components that may be inter-coupled in any manner In various embodiments, transcode module is implemented with a host interface 242 that physically and logically interfaces with a corresponding bus interface 240 on host device 108 over a direct data connection 238. Interfaces 240 and 242 can be implemented using any type of serial, parallel or other conventional interface capable of directly connecting host device 108 and transcode module 115 in a manner that allows convenient and defined communications between the two components. In various embodiments, interfaces 240 and 242 are directly connected to each other using any sort of bus or other direct connection; to that end, interfaces 240 and 242 may be conventional bus interfaces such as universal serial bus (USB) or similar interfaces that correspond to published or other well-known standards. A USB implementation, for example, may allow host device 108 and transcode module 115 to physically couple using conventional mini-USB Type B connectors or the like. "Coupling" of transcode module 115 to host device 108 to may be performed using any sort of direct physical connection between the two devices, or any sort of indirect physical connection in which the two devices are connected with one or more intervening cables, hubs, cradles, docks and/or other devices that facilitate physical and logical interaction between the two components.

Similarly, conventional microcontroller circuits could be used to control logical access and communications between host device 108 and transcode module 116. One example of a conventional USB microcontroller is the model CY7C68053 controller available from Cypress Semiconductor Corp. of San Jose, Calif., although any number of other conventional or other bus controllers could be equivalently used. The control circuitry associated with interface 242 may communicate with other components of transcode module (e.g., processor 250) using any sort of general programming interface (GPIF), bus or other connection, as appropriate.

Generally speaking, it may be desirable in many implementations to provide electrical power for the entire transcode module 115 using the power supplied from the USB or other interface 242. In such implementations, electrical power can be obtained from host device 108 via interface 240, thereby reducing or even eliminating the need for a battery or separate power source for transcode module 115. To that end, transcode module 115 may include a power management circuit 244 that receives electrical power from the host interface 242 and distributes appropriate power signals to each of the other powered components within transcode module 115. The VBUS or other power supplied by a conventional USB interface, for example, may be appropriately provided to processor 250 and/or any other components of transcode module 115 as desired. In an exemplary embodiment, the 2.5 volts conventionally supplied on to a USB interface 242 may be provided to a power management integrated circuit (PMIC) for conversion into other voltages (e.g., 0.96 volts, 1.8 volts, 3.3 volts and/or any other voltages as desired) used by the various other components of transcode module 115. One example of a PMIC that may be used in some embodiments is a model TPS65023 PMIC available from Texas Instruments Inc. of Dallas, Tex., although other embodiments may use other products or circuits as desired.

Clock signals may also be extracted from interface 242 and/or generated on-board in any manner. In various embodiments, transcode module 115 includes a clock generation circuit or other component 246 for generating appropriate clock signals used by the various other components. Clock generator 246 may be, for example, a crystal or other signal generator that is capable of producing appropriate clock signals (e.g., a 24 Mhz clock in some embodiments, although other embodiments may use any number of alternate or additional frequencies).

Various embodiments may also include a readable memory 252 that includes boot instructions, operating instructions and/or other firmware code that can direct the operation of transcode module 115. Memory 252 may be, for example, a read only memory (ROM), a flash memory, an externally erasable programmable read only memory (EEPROM), or other type of digital storage medium capable of maintaining instructions executable by processor 250 even when electrical power is not available to module 115. In various embodiments, however, the functionality of memory 252 may be combined into processor 250 or any other components as appropriate.

Processor 250 is any type of microprocessor, microcontroller, digital signal processor, programmable logic or other computing hardware capable of transcoding media streams as described herein. In various embodiments, processor 250 is a system-on-a-chip (SoC) video processor such as the model DXT-LP processor available from Magnum Semiconductor of Milpitas, Calif., although equivalent embodiments may be based upon processors available from Texas Instruments, Broadcom, ViXS Systems, or any number of other sources.

Processor 250 interacts with one or more digital memories 248 for storage of instructions and/or data. Any number of memories 248 of any type may be provided; different types of memories 248 that may be used include any sort of static or dynamic random access memories (SRAM, DRAM, SDRAM or the like), including any sort of double, quad or other data rate (e.g., DDR, QDR or the like) RAM as desired. In an exemplary embodiment, processor 250 interacts with one or more DDR SDRAM modules available from any number of suppliers. In other embodiments, different numbers or types of RAM modules are used. In still other embodiments, memory 248 is integrated with processor 250, for example in any sort of conventional microcontroller or other SoC-type of circuitry.

Processor 250 suitably performs session establishment, decryption, transcoding and/or encryption of received media streams in support of placeshifting or other desired functions. Access to processor 250 may be provided by, for example, driver application or similar control 215 executing on host device 108 that communicates with processor 250 using any appropriate application programming interface (API), as described above.

Generally speaking, transcoding module 115 receives a compressed encoded stream from selector 212 (or the like). The received stream is typically encrypted, as described more fully below, to create stream 107 that can be provided over interfaces 240-242 to transcode module 115. Transcode module 115 suitably decrypts the received stream 107 and performs a digital-to-digital conversion to create a media stream 109 in a desired format and having desired parameters. The transcoded stream may then be re-encrypted and provided to host device 108 for storage, transport on network 102 and/or any other subsequent use.

In operation, then, host device 108 suitably receives one or more media streams 105 from a DBS, cable, stored media, network or other source. Received and/or stored content 105 may be encrypted and provided to processor 250 of transcoding module 115 as stream 107 via connection 238 between interfaces 240 and 242. Processor 250 then appropriately decrypts, transcodes and/or otherwise converts the received signals to a transcoded stream 109 that can be transmitted to the remote device 112 over network 110 using network interface 210 of host device 108, as described more fully below. Control of the placeshifting or other transcoding processes, including any communications related to security or authentication, may take place under the direction of processor 250, which may interface with application 215 or the like within device 108 to receive stream 107 and for access to network 102.

FIG. 3 shows an exemplary process 300 for securely establishing a placeshifting media stream between a host device 108 and a remote device 112. FIG. 3 shows exemplary messages sent and received by each of entities 108, 112 and 115 involved in the security process 300, as well as other actions that may be performed by one or more entities within system 100 (FIG. 1). In practice, the overall process 300 may be implemented with various methods executed by one or more entities 108, 112 and/or 115 as described more fully below. Generally speaking, each of the functions shown in FIG. 3 may be implemented in software or firmware that may be stored in memory, mass storage or any other storage medium available to the executing device, and that may be executed on any processor or control circuitry associated with the executing device. For example, the various functions shown with respect to host device 108 may be executed by software instructions contained within one or more applications (e.g., application 215) executing in control module 205 or other logic of host device 108. Similarly, the various functions shown with respect to transcode module 115 may be executed by software instructions executing on processor 250. Such instructions may be stored in memory 248, storage 252, and/or in any other digital storage medium as desired. The particular means used to perform the various functions shown in FIG. 3, then, will typically be computer software or firmware executing the algorithms described herein on the indicated component, although other embodiments may equivalently implement such functions with dedicated hardware or the like.

Generally speaking, host device 108 receives and processes media content in any manner (function 301). In embodiments wherein host device 108 is a conventional STB, for example, device 108 would typically receive, demodulate, decode and/or decrypt television content received from a DBS, cable and/or broadcast source. Received programming signals 105 (FIG. 1), for example, are typically encrypted using a cryptographic key, coded into a multiplex or other distribution format, and modulated on an analog carrier wave prior to transmission. A host STB device 108 therefore receives, demodulates, decodes, decrypts and/or otherwise processes received programming or other signals 105 as appropriate to present the content to the viewer on the local display. In embodiments that support placeshifting, the received content may be demodulated, decrypted and/or otherwise processed to place the received media stream 105 into a format that can be processed by transcode module 115. Received DBS or cable programming signals, for example, may be demodulated, decrypted and suitably decoded to extract an MPEG or other stream that can be used for subsequent processing. Decrypting of content 105 in some embodiments may be performed using cryptographic keys or other resources that may be provided by the television aggregator or system operator, as appropriate. Processing of the received programming stream(s) 105 may be performed by receiver module 208 (FIG. 2), decoder module 214, control logic 205 and/or other logic within host device 108. Such processing may take place on any temporal basis; receiving and processing of programming signals 105 may take place concurrently with any placeshifting functions, for example, and/or in the absence of placeshifting as desired by the viewer.

A placeshifting session within process 300 typically begins with the remote device 112 requesting a placeshifting session over network 102 (function 302). This may be initiated by, for example, a user of remote device 102 opening a media player application, or otherwise initiating the process of viewing placeshifted media. In various embodiments, the remote device 102 is able to identify a source of placeshifted content (e.g., transcode module 115 using the network communication features of host 108) on network 102 using a central server or the like. The central server may have previously received registration information that allows users to find and establish placeshifting sessions with a particular transcode module 115 on network 102. The central server may also authenticate the user (e.g., with a userid/password or other credential) prior to authorizing the placeshifting session.

Upon successful authentication with the central server, the remote device 112 is able to request a connection by sending a message 302 to host device 108 via network 102. This request 302 may be sent using any suitable protocol or other format that can be received an interpreted by host device 108. In an exemplary embodiment, remote device 102 obtains an IP address or other identifier associated with the host device 108 from a central server operating on network 102 that allows the remote device 112 to contact the desired host device 108 directly via network 102.

The request 302 is received at host device 108 in any manner. In various embodiments, the receipt of a session request 302 invokes a process 215 to handle the placeshifting session. In other embodiments, a handler application 215 is already executing on host device 108 prior to receipt of request 302. In either case, the received session request 302 from remote device 112 is forwarded to notify transcode module 115 that a session is to be initiated (function 304). This notification typically takes place through any sort of message transmitted across connection 238 between interfaces 240 and 242.

Transcode module 115 establishes the requested placeshifting session in any manner (function 306). In various embodiments, processor 150 (or other logic in transcode module 115) executes a server process or application that interacts with remote device 112 (and/or any other services available on network 102) using the connection to network 102 provided by host device 108. Session establishment may involve opening a first transport session with host device 108 to facilitate reception of encrypted stream 107 and a second transport session with remote device 112 to provide transcoded stream 109.

As noted above, it is generally desirable to encrypt media content transferred across network 102 and/or connection 238. To that end, transcode module 115 appropriately generates, negotiates or otherwise establishes one or more cryptographic keys that can be used in the placeshifting session. These session keys may be established according to any conventional, proprietary, open and/or other formats and techniques, and the encryption technology used for obfuscating the exchanged content data may use any proprietary or industry standard techniques such as the advanced encryption standard (AES), the data encryption standard (DES), and/or any other techniques presently known or subsequently developed. To that end, processor 250 on transcode module 115 may execute a cryptography server application or routine that separately interacts with a client routine running on host device 108 (e.g., as part of application 215) and another client routine running on remote player 112 (e.g., as part of a media player application or the like). To that end, the server routine executing on processor 250 suitably generates or otherwise establish session keys to be shared with the two separate clients. Keys established by the server routine may be used to encrypt and decrypt streams 107 and 109 as desired.

Session keys may be established for communications between the cryptography server and its various clients in any manner. In the exemplary embodiment shown in FIG. 3, transcode module 115 establishes keys or other cryptographic credentials used in a particular session through any sort of handshaking procedures 308, 310. FIG. 3 shows one handshake 308 between transcode module 115 to establish the parameters used for encrypting stream 107 and another handshake 310 between transcode module 115 and remote device 112 to establish parameters for stream 109. Handshake 308 may be performed between the cryptography server application executing on processor 250 and a client application executing on host device 108 (e.g., as part of application 215). Similarly, handshake 310 may occur between the cryptography server application on processor 250 and a client application executing (e.g, as part of a media player application) on remote device 112. In some embodiments, a single session key may be used to encrypt both the stream 107 that is received from the host device 108 and the stream 109 that is transmitted to the remote player 112. In other embodiments, two separate session keys may be established so that the stream 107 from the host device 108 is encrypted with a first key and the transcoded stream 109 transmitted to the remote player 112 is encrypted with a second key. Other techniques for key generation, distribution and/or negotiation may be used in any number of equivalent embodiments.

The particular content of stream 107 may be determined in any manner. As noted above, the user of the remote device 112 can provide instructions to select and adjust the particular content desired for the placeshifted stream (function 315). Such content may be selected from stored content on a DVR or other database 110, content 105 received from a broadcast or source of television programming, or from any other source. Generally, user selections for desired content and any other command and control instructions 312 are provided from remote device 112 to transcode module 115, which appropriately processes the instructions and directs the host device to adjust the source stream 107 accordingly (function 314). To that end, transcode module 115 may receive any sort of program selection, source selection or other instructions 312 from remote device; these instructions may be relayed in any manner to host device 108. Such instructions may be provided over connection 238 to application 215, for example, which appropriately interacts with software, firmware or other logic executing within host device 108 to change the source stream 107 as desired by the user. Command and control instructions 312 could be provided and processed at any time during the placeshifting process; corresponding instructions 314 may be processed accordingly to adjust the content of the stream. As the viewer wishes to change programs or otherwise adjust the received stream 109, the source stream 107 provided by host device 108 can be adjusted in response to instructions 312 and 314 so that the remote viewer receives the desired content in the desired format.

As noted above, at least one session key is used by host device 108 to encrypt the selected media stream 107 (function 316). Such content is appropriately encrypted by application 215 or elsewhere within host device 108 using at least one of the session keys to prevent unauthorized interception. The encrypted stream 107 is then transmitted from host device 108 across connection 238 to transcode module 115.

Transcode module 115 suitably decrypts the encoded stream 107 using the appropriate session key (function 318). As noted above, a single session key may be used by transcode module 115 to both decrypt the received encoded stream and to re-encrypt the transcoded stream. Alternatively, two separate keys could be used, with each stream being encrypted with its own session key. After decryption, the transcode module 115 suitably transcodes the received media stream (function 320) to place the media stream in a desired format, and then re-encrypts the transcoded stream (function 322) prior to transmission to remote player 112 (function 324) via connection 238. The transcoded and encrypted stream 324 can be relayed (function 326) to remote player 112 over network 102 as appropriate; in various embodiments, application 215 receives stream 109 from interface 240 and relays the received stream to network interface 210 for transmission over network 102 to remote device 112.

Transcoding of the received media stream can be performed in any manner. Generally speaking, transcoding involves performing a conversion of received content from one digital format to another using processor 250 or the like. Received media streams may be transcoded from MPEG or similar formats to H.264 format or the like, for example, to improve compression and thereby provide more efficient storage or data transmission. In various placeshifting embodiments, transcoding 320 involves converting the received media stream from a compressed or uncompressed video stream to a format that is more suitable for transmission across network 102, such as WINDOWS MEDIA, QUICKTIME, H.264 and/or any other format. Transcoding, encryption and/or transmission of content in media stream 324 may be adjusted in any manner during operation. In various embodiments, the media player application associated with remote player 112 provides command and control information to device 108 or to transcode module 115 that may be used to adjust or otherwise control transcoding, encryption or transmission as desired. Transcoding may also involve altering the encoding based upon a status of network 102, host device 108, remote player 112 and/or the like. Transcoding may be adjusted to lower a frame rate, bit rate and/or resolution in response to congestion on network 102, for example. Several examples of transcoding techniques suitable for use with placeshifting are described in U.S. Patent Publication 2006/0095471, although other placeshifting and/or transcoding features may be implemented in a wide array of alternate embodiments.

In equivalent embodiments that make use of transcoding features without necessarily providing placeshifting functionality, media content transferred between host device 108 and transcoding module 115 can be similarly encrypted to protect the content from unauthorized interception. In such embodiments, the host device would typically store and/or further process the transcoded stream in either an encrypted or decrypted format, as desired.

As noted above, the transcoded stream 109 is provided remote device 112 using the network interface features of host device 108. The encrypted stream 109 is therefore provided to host 108 via connection 238 for re-transmission on network 102. In placeshifting embodiments, application 215 or another feature of host device 108 appropriately receives the encrypted and transcoded stream 109 and relays the stream on network 102 to the remote player 112 (function 326). The remote player 112 is then able to receive the transcoded stream 324, to decrypt the stream (function 330), and then to decode the decrypted stream for playing or otherwise rendering of the media content to the user (function 332).

From the varying perspectives of devices 108, 112, and 115, then, various methods for establishing a secure placeshifting session are described in FIG. 3. With respect to host device 108, for example, a method for placeshifting a media stream to a remote player 112 suitably involves encrypting the media stream (function 316) that is in a first format to create an encrypted media stream 107, providing the encrypted media stream 107 from the host device 108 to transcode module over the direct connection 238, receiving the transcoded media stream 109 from the transcode module 115 via connection 238, and relaying the media stream 109 in the second format to the remote player 112 via the communication network 102 (function 326). The various functions of this method may be carried out by any processing circuitry or logic associated with device 108, including control logic 205 and/or application 215 shown operating in FIG. 2.

With respect to the transcode module 115, an encrypted media stream 107 in a first format is received from the host device 108. This encrypted stream is decrypted 318 to extract the media stream in the first format, and the stream is transcoded 320 to a second format different from the first. The media stream in the second format is then appropriately encrypted 322 and provided to the host 108 for storage, re-transmission and/or other use as desired. Transcode module may further establish the placeshifting session (function 306) with remote player 112 and host device 108, and may manage any command and control instructions 314 received from the remote player 112 by providing suitable instructions 316 to host device 108. The various functions of this method may be executed within a software or firmware executing on processor 250 of transcode module 115.

Using the various systems, methods and other concepts described herein, any number of advantages may be achieved. By providing a transcode module as a separate hardware component that can be coupled to a host device, host devices that do not presently have the capability to transcode and/or placeshift media content can be expanded to provide such functionality in some embodiments. A conventional set-top box, DVR or other media player, for example, can be enhanced to provide transcoding and/or placeshifting features using external transcode modules as described herein. Further, by providing sufficient cryptographic and other security features, access to placeshifted content can be limited to authorized users, thereby preserving the security of the placeshifted/transcoded media content.

As noted at the outset, the various features described herein may be selectively applied, and not all features will be found in all embodiments. For example, it is not necessary that all embodiments relate to STB host devices or placeshifting. To the contrary, various transcode modules could be used with any number of media players or other host devices to perform any number of features, including simple format conversions. Various embodiments, for example, could provide conversion from a streaming to a file-based format for playback on a conventional portable media player, or conversion of received media streams to more compressible formats (e.g., H.264 format) for more efficient file storage in a DVR or the like. Other embodiments could be used in conjunction with a personal computer or similar host device to assist in streaming media over a network (e.g., from a media projector application such as the SLING PROJECTOR application available from Sling Media Inc.), or for any other purpose.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A removable transcoding device configured to be inserted into a television receiver that is operated by a television viewer, the removable transcoding device comprising:
   a host interface configured to be directly inserted into the host device to thereby physically and electrically couple the removable transcoding device to the television receiver and to facilitate electronic communication between the removable transcoding device and the television receiver; and
   a processor disposed within the removable transcoding device, wherein the processor is configured to receive a first encrypted stream from the television receiver that is physically coupled to the removable transcoding device via the host interface, wherein the first encrypted stream comprises a media stream in a first format, and wherein the processor is further configured to decrypt the first encrypted stream, to transcode the media stream from the first format to a second format different from the first format that is routable on a communications network, to encrypt the transcoded media stream in the second format to generate a second encrypted stream, and to provide the second encrypted stream to the television receiver via the host interface to thereby allow the television receiver to securely forward the second encrypted stream over the communication network to a remote device, wherein the remote device is operated by the same television viewer that operates the television receiver, and wherein the second encrypted stream is transmitted to the remote device via the communication network without the television receiver decrypting the second encrypted stream, and wherein the processor is further configured to receive an instruction from the remote device via the host interface, and to direct the television receiver to adapt the first encrypted stream in response to the instruction received from the remote device;
   wherein the processor establishes a first secure session with the television receiver and a second secure session with the remote device, and wherein the first secure session transports the first encrypted media stream from the television receiver to the removable transcoding device and control instructions from the removable transcoding device to the television receiver via the host interface, and wherein the second secure session transports the instruction from the remote device to the removable transcoding device and the second encrypted stream from the removable transcoding device to the remote device, and wherein the processor is further configured to establish a first key with the television receiver for the first secure session and to establish a second key with the remote device for the second secure session.

2. The removable transcoding device of claim 1 wherein the processor is further configured to establish a placeshifting session with the remote device, and wherein the second encrypted stream is transmitted to the remote device over the communication network via the host interface of the transcode module.

3. The removable transcoding device of claim 1 further comprising a power management module configured to receive electrical power from the host interface and to provide at least a portion of the electrical power to the processor.

4. The removable transcoding device of claim 1 wherein all of the electrical power for the transcoded module is received from the television receiver via the host interface.

5. The removable transcoding device of claim 1 wherein the removable transcoding device is a stick-sized device, and wherein the host interface is a universal serial bus (USB) interface.

6. The removable transcoding device of claim 1 wherein the processor is further configured to decrypt the encrypted stream and to encrypt the transcoded media stream using a common session key.

7. A method executable by a digital processor of a removable transcode device that physically and electrically interfaces with a consumer-operated television receiver via a host interface, the method comprising:
 establishing a first secure session with the television receiver using a first session key;
 establishing a second secure session distinct from the first secure session with a remote device using a second session key;
 receiving a first encrypted media stream from the consumer-operated television receiver that is directly physically and electrically connected to the removable transcode device via the host interface, wherein the first encrypted media stream comprises a media stream in a first format;
 decrypting the first encrypted media stream by the removable transcode device to extract the media stream in the first format;
 transcoding the extracted media stream from the first format to a second format different from the first format by the removable transcode device;
 encrypting the transcoded media stream in the second format to generate a second encrypted media stream by the removable transcode device; and
 providing the second encrypted media stream from the removable transcode device to the consumer-operated television receiver that is physically and electrically connected to the removable transcode device via the host interface to thereby allow the consumer-operated television receiver to securely relay the second encrypted media stream to a remotely-located consumer-operated remote device that is operated by the same consumer that operates the television receiver that electrically interfaces with the removable transcode device without the consumer-operated television receiver decrypting the second encrypted media stream;
 receiving an instruction from the remotely-located consumer-operated remote device to adapt the first encrypted media stream; and
 controlling the consumer-operated television receiver to thereby adapt the first encrypted media stream provided to the removable transcode device in response to the instruction;
 wherein the first secure session transports the first encrypted media stream from the television receiver to the removable transcoding device and control instructions from the removable transcoding device to the television receiver via the host interface, and wherein the second secure session transports the instruction from the remote device to the removable transcoding device and the second encrypted stream from the removable transcoding device to the remote device.

8. The method of claim 7 further comprising establishing a placeshifting session with the remote device from the removable transcode device, and wherein the providing comprises facilitating transmission of the second encrypted media stream from the removable transcode device to the remote device over the communications network via the consumer-operated television receiver.

9. The method of claim 7 further comprising receiving a request for a placeshifting session from a remote device via the host interface, wherein the remote device is in communication with the consumer-operated television receiver via a communication network.

10. The method of claim 7:
 wherein the decrypting comprises decrypting the first encrypted media stream using the first session key, and wherein the encrypting comprises encrypting the second encrypted media stream using the second session key.

11. A method executable by a television receiver that is operated by a viewer, the method comprising:
 receiving a media stream that is selected by the viewer at the television receiver;
 in a normal operating mode, providing television programming contained within the received media stream to a display for presentation to the viewer; and
 in response to a viewer instruction received from the viewer to switch from the normal operating mode to a placeshifting mode in which the television programming is provided to a remote player via a communications network instead of the display;
 encrypting the media stream by the television receiver to create an encrypted media stream in a first format;
 providing the encrypted media stream from the television receiver to a removable transcode device that is directly physically and electrically connected to the host device;
 allowing the removable transcode device to establish a secure session with a remote player via a communication network using a network interface of the television receiver, wherein the secure session between the removable transcode device and the remote player transmits a transcoded media stream
 that comprises the media stream in a second format different from the first format that is routable on the communication network, wherein the transcoded media stream is encrypted by the removable transcode device using a key that is uniquely shared with the remote player, and wherein the secure session also transmits an instruction from the remote player to the removable transcode device that instructs the removable transcode device to adapt the media stream; and
 receiving a command signal from the removable transcode device in response to the instruction; and
 responding to the command signal by adapting the media stream provided from the television receiver to the removable transcode device;
 wherein the removable transcode device establishes a first secure session with the television receiver and a second secure session with the remote device, and wherein the first secure session transports the first encrypted media stream from the television receiver to the removable transcoding device and control instructions from the removable transcoding device to the television receiver via the bus interface, and wherein the second secure session transports the instruction from the remote device to the removable transcoding device and the second encrypted stream from the removable transcoding device to the remote device, and wherein the processor is further configured to establish a first key with the television receiver for the first secure session and to establish a second key with the remote device for the second secure session.

12. The method of claim 11 wherein the responding comprises selecting different television programming for the media stream in response to the instruction received from the removable transcode device.

13. The method of claim 11 further comprising receiving a television programming stream from a television system operator at the television receiver, and demodulating the television programming stream by the television receiver to create the media stream in the first format.

14. A set top box configured to be located at a viewer's premises for operation by the viewer to receive a television programming stream for presentation to the viewer via a display, the set top box comprising:
   a receiver interface configured to receive the television programming stream; a display interface configured to provide television programming signals to the display;
   a network interface configured to be coupled to a digital communications network;
   a bus interface configured to couple with a removable transcode device, wherein the removable transcode device is a physical device that is separate from the set top box but that directly physically and electrically connects to the set top box via the bus interface; and
   a controller configured to direct the reception of the television programming stream via the receiver interface, to receive a request for a placeshifting session from a remote player operated by the same viewer that operates the set top box, wherein the request is received via the network interface, and wherein the controller is configured to establish an encryption key with the removable transcode device, to encrypt the received television programming stream using the encryption key, to provide the encrypted television programming stream from the set top box to the removable transcode device that is directly physically coupled to the set top box, to receive a transcoded media stream from the removable transcode device via the bus interface that is encrypted to the remote player operated by the viewer, to transmit the transcoded media stream to the remote player via the network interface without the set top box decrypting the transcoded media stream, to receive a command signal from the removable transcode device that is sent in response to an instruction received from the remote device by the removable transcode device, and to adapt the media stream provided to the removable transcode device in response to the command signal; wherein the removable transcode device establishes a first secure session with the set top box and a second secure session with the remote device, and wherein the first secure session transports the first encrypted media stream from the set top box to the removable transcoding device and control instructions from the removable transcoding device to the set top box via the bus interface, and wherein the second secure session transports the instruction from the remote device to the removable transcoding device and the second encrypted stream from the removable transcoding device to the remote device, and wherein the processor is further configured to establish the encryption key with the set top box for the first secure session and to establish a second key with the remote device for the second secure session.

15. The set top box of claim 14 wherein the controller is further configured to direct a demodulation of the television programming stream to create a media stream in a first format, and wherein the controller is further configured to provide the media stream in the first format to either the display interface for presentation on the display or to the removable transcode device for transcoding of the media stream from the first format to a second format different from the first format that is transmittable on the digital communications network to thereby allow placeshifting of the television programming stream to the remote player over the communications network.

16. The set top box of claim 14 wherein the bus interface is a universal serial bus (USB) interface, and wherein the removable transcode device is a USB-compatible device that is physically connected to the set top box using the USB interface, and wherein the bus interface provides all of the electrical power used by the transcode module.

* * * * *